J. T. RICHEY.
COTTON CHOPPER.
APPLICATION FILED NOV. 28, 1914.

1,152,975.

Patented Sept. 7, 1915.
2 SHEETS—SHEET 1.

Witnesses
J. L. Wright
Wm. Dagger

Inventor
J. T. Richey
By Victor J. Evans
Attorney

J. T. RICHEY.
COTTON CHOPPER.
APPLICATION FILED NOV. 28, 1914.
1,152,975.
Patented Sept. 7, 1915.
2 SHEETS—SHEET 2.
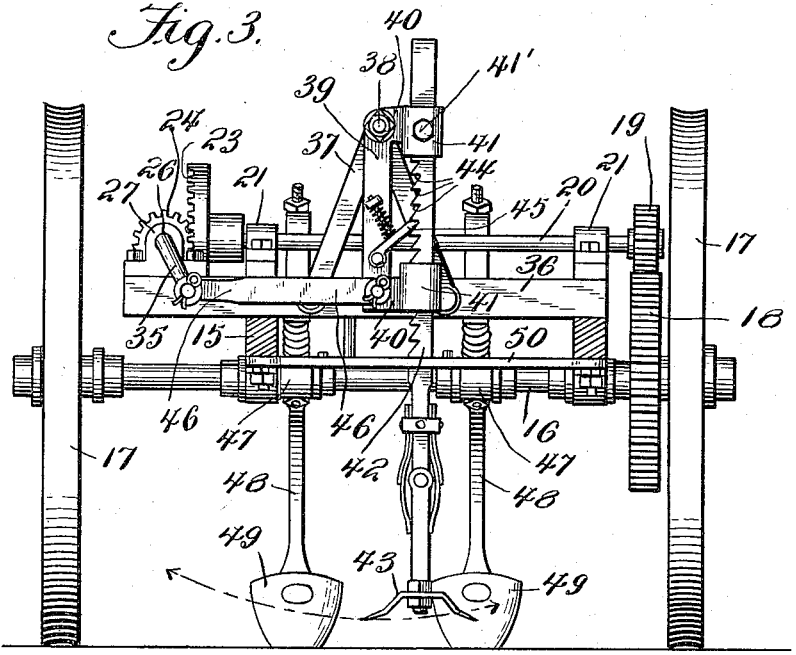
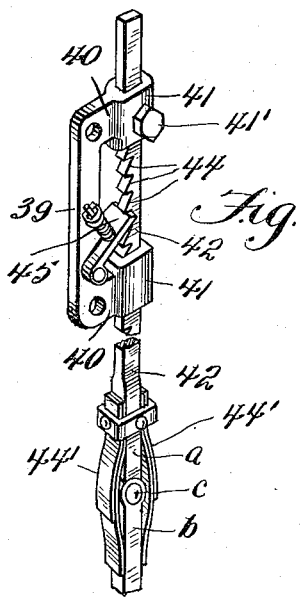

UNITED STATES PATENT OFFICE.

JOHN T. RICHEY, OF ROGERSVILLE, ALABAMA.

COTTON-CHOPPER.

1,152,975.

Specification of Letters Patent.

Patented Sept. 7, 1915.

Application filed November 28, 1914. Serial No. 874,541.

*To all whom it may concern:*

Be it known that I, JOHN T. RICHEY, a citizen of the United States, residing at Rogersville, in the county of Lauderdale and State of Alabama, have invented new and useful Improvements in Cotton-Choppers, of which the following is a specification.

This invention relates to cotton choppers of that class in which a wheel supported frame carries a reciprocatory hoe and means for transmitting motion to said hoe from one of the supporting wheels.

One object of the invention is to simplify and improve the manner of supporting and mounting the hoe and to provide for the vertical adjustment of the same.

A further object of the invention is to produce an organized machine of the class described which will possess superior advantages in point of simplicity, durability and general efficiency.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

Figure 1:
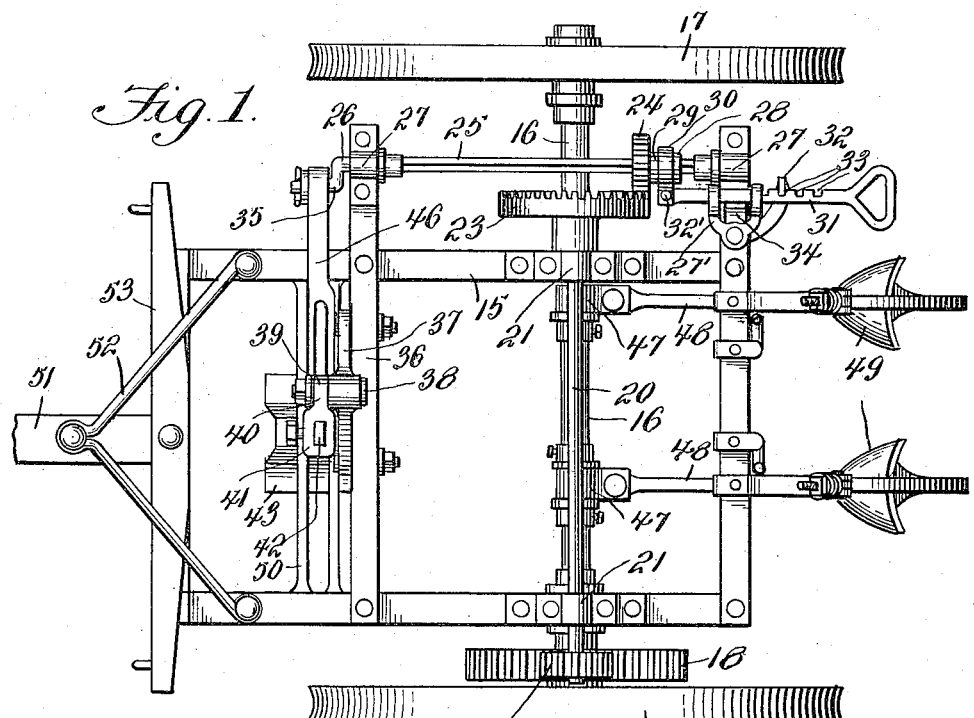
Figure 2:
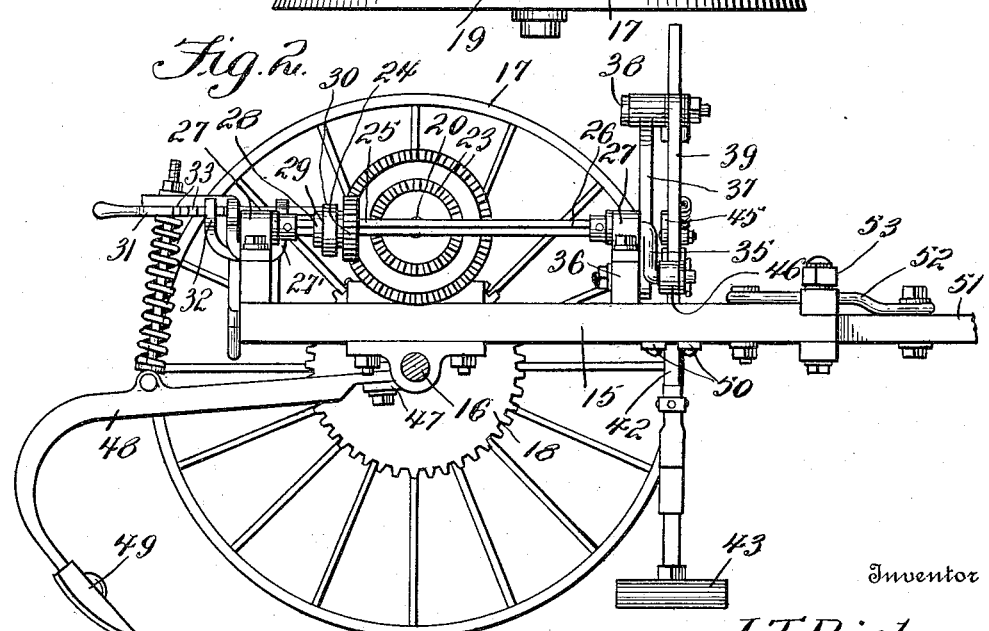

In the drawings, Figure 1 is a top plan view of a machine constructed in accordance with the invention. Fig. 2 is a side elevation of the same, the near wheel having been removed. Fig. 3 is a front elevation partly in section. Fig. 4 is a perspective detail view of the rocking frame and the hoe handle carried thereby.

Corresponding parts in the several figures are denoted by like characters of reference.

The frame 15 which is mainly of rectangular shape rests on the axle 16 which is supported by wheels 17, one of which carries a spur wheel 18 meshing with a pinion 19 on a counter shaft 20 which is supported in bearings 21 on the frame above the axle. The counter shaft carries a greater disk having a plurality of concentrically disposed series of teeth 23, any one of said series of teeth being adapted to mesh with a pinion 24 which is disposed slidably upon the non-circular portion 25 of a shaft 26 which is supported for rotation in bearings 27. The pinion 24 which is obviously revoluble with the shaft 26 has a hub 28 provided with an annular groove 29 which is engaged by a ring or collar 30 connected with a slide 31 which is guided on a supporting member 27' which is provided with a stop member 32 adapted to engage any one of a plurality of notches 33 in the slide, the latter being engaged by a spring 34, whereby its notched edge is maintained in engagement with the stop member. The slide 31 is connected with the collar 32 by a pivot member 32' which enables said slide to be rocked against the tension of the spring for the purpose of disengaging it from the stop member. By this simple arrangement the pinion 24 may be moved along the non-circular portion 25 of the shaft 26, enabling said pinion to be placed in mesh with any one of the series of teeth 23 and thereby varying the speed of rotation of the shaft 26.

The shaft 26 is provided with a crank 35. Mounted on a cross bar 36 of the frame structure is a bracket 37 carrying a spindle 38 on which a downwardly extending arm 39 is mounted for oscillation. The arm 39 is provided with laterally extending brackets 40 having terminal sleeves 41 wherein a handle 42 carrying a hoe blade 43 is vertically slidable, said handle being provided with notches 44 any one of which may be engaged by a spring actuated latch member 45 for the purpose of securing the hoe carrying handle at the desired adjustment. The arm 39 is connected with the crank 35 by means of a pitman 46, whereby oscillatory or rocking movement will be imparted to the arm and also to the hoe, as will be readily understood. One of the sleeves 41 is equipped with a set screw 41' adapted to engage and bear against the hoe carrying handle 42 for the purpose of preventing accidental displacement of the same in an upward direction.

The hoe handle 42 is preferably constructed of two separate parts or members *a*, *b* connected together by a hinge joint *c*, as best seen in Fig. 4. Connected with the upper member *a* are flat springs 44', the free ends of which engage opposite side faces of the lower member *b* which is thus normally maintained in alinement with the top member *a*. Owing to this construction, in the event of rocks, stumps or other obstructions being encountered by the hoe, the latter will yield to such obstructions without danger of breakage of the handle or other parts.

The axle 16 is provided with sleeves or collars 47 with which beams 48 carrying plows or cultivators 49 are connected in such fashion as to be free to swing laterally, said beams being adapted to be supported and actuated in any convenient well known manner for the purpose of disposing of the plants that are chopped out from the row and also throwing loose dirt in the direction of the plants that are left standing.

The frame of the machine has been shown as being provided with a slotted guide 50 for the purpose of steadying the movement of the hoe carrying handle. The frame is also shown as being provided with suitable draft means including a tongue 51, hounds 52 and an evener 53, but it is obvious that the construction and arrangement of the draft appliances may be varied in any desired manner.

It will be seen from the foregoing description taken in connection with the drawings hereto annexed that I have produced a simple and efficient machine whereby the labor of chopping out cotton which has heretofore been performed mainly by hand may be accomplished successfully, expeditiously and at a greatly decreased expense.

Having thus described the invention, what is claimed as new, is:—

1. In a cotton chopper, a wheel supported frame having a bracket and a spindle supported by said bracket, an arm mounted for oscillation on the spindle and having laterally extending brackets provided with terminal sleeves, a notched hoe carrying handle guided through said sleeves, a spring actuated latch member mounted on the arm for engagement with the notched handle, and means for rocking the arm.

2. In a cotton chopper, the combination with a wheel supported frame, of an arm supported for oscillation, said arm having laterally extending brackets provided with terminal sleeves, a hoe carrying handle guided in said sleeves, said handle having notches in one side face thereof, a spring actuated dog pivotally mounted on the arm and engaging the notches in the handle, a set screw threaded into one of the sleeves and engaging the handle to prevent accidental displacement thereof, and means for imparting oscillatory motion to the arm from a supporting wheel of the machine.

In testimony whereof I affix my signature in presence of two witnesses.

JOHN T. RICHEY.

Witnesses:
 IRA N. BEDINGFIELD,
 H. V. HARVEY.

Copies of this patent may be obtained for five cents each, by addressing the "Commissioner of Patents, Washington, D. C."